(12) United States Patent
Jordil

(10) Patent No.: US 8,516,710 B2
(45) Date of Patent: Aug. 27, 2013

(54) MANUALLY PROGRAMMABLE MOTORIZED MACHINE FOR MEASURING COORDINATES

(75) Inventor: Pascal Jordil, Ecoteaux (CH)

(73) Assignee: Tesa SA, Renes (CH)

( * ) Notice: Subject to any disclaimer, the term of this patent is extended or adjusted under 35 U.S.C. 154(b) by 328 days.

(21) Appl. No.: 12/871,006

(22) Filed: Aug. 30, 2010

(65) Prior Publication Data

US 2011/0056085 A1 Mar. 10, 2011

(30) Foreign Application Priority Data

Sep. 7, 2009 (CH) ........................................ 1382/09

(51) Int. Cl.
*G01B 5/008* (2006.01)
(52) U.S. Cl.
USPC ............................................................. 33/503
(58) Field of Classification Search
USPC ............................................................. 33/503
See application file for complete search history.

(56) References Cited

U.S. PATENT DOCUMENTS

| | | | | |
|---|---|---|---|---|
| 7,599,813 B2 * | 10/2009 | Grupp | ............................ | 702/152 |
| 7,752,766 B2 * | 7/2010 | Ruck et al. | ........................ | 33/503 |
| 7,809,523 B2 * | 10/2010 | Hunter et al. | ................... | 702/168 |
| 7,891,248 B2 * | 2/2011 | Hough et al. | .................... | 73/634 |
| 8,201,341 B2 * | 6/2012 | Ferrari | ............................ | 33/503 |
| 2003/0069709 A1 * | 4/2003 | Noda et al. | ...................... | 702/104 |
| 2009/0271997 A1 * | 11/2009 | Ruck et al. | ........................ | 33/503 |
| 2011/0119025 A1 * | 5/2011 | Fetter et al. | ..................... | 702/152 |
| 2012/0060384 A1 * | 3/2012 | Grozinger et al. | ............... | 33/503 |
| 2012/0060385 A1 * | 3/2012 | Hunter et al. | ................... | 33/503 |
| 2012/0084989 A1 * | 4/2012 | Pettersson et al. | .............. | 33/503 |

\* cited by examiner

*Primary Examiner* — Christopher Fulton
(74) *Attorney, Agent, or Firm* — Pearne & Gordon LLP

(57) ABSTRACT

Multidimensional coordinate measuring machine having a programming mode in which the measuring head can be displaced manually by an operator and a measuring mode in which a control unit is designed for automatically optimizing and reproducing the displacements of the measuring head recorded during the programming mode.

19 Claims, 3 Drawing Sheets

MANUALLY PROGRAMMABLE MOTORIZED MACHINE FOR MEASURING COORDINATES

REFERENCE DATA

The present application claims priority of Swiss patent application CH-09/1382 filed on Sep. 7, 2009.

TECHNICAL FIELD

The present invention concerns a coordinate measuring machine (CMM) or a computer numerical control (CNC) machine equipped with a measuring probe and, in particular, a coordinate measuring machine provided with a quick and intuitive programming interface, as well as the method for programming a measuring program with such a machine.

STATE OF THE ART

It is well known how to use coordinate measuring machines (also called CMM) provided with a mobile head and a measuring probe for measuring a series of coordinates of the surface of a machined tool or of any object. One knows in particular coordinate measuring machines with a traveling bridge having three linear orthogonal axes, or also machines with an articulated arm, wherein the measuring probe is fastened to the extremity of an articulated arm with several rotation axes, or also machines combining linear axes and rotation axes. CMMs generally have encoders enabling the position of the measuring head at a given instant along each independent axis to be determined and, by means of an appropriate calibration, the coordinates of the measured point to be obtained.

The measuring probe can be a trigger feeler, with a stylus provided with a ruby sphere designed to touch the part to be measured, or also a touchless probe, for example an optical probe.

One can also distinguish between manual measuring machines, wherein the probe is moved manually by an operator, and motorized measuring machines capable of autonomous movements determined by the operator with an appropriate remote control, for example, or according to a predetermined program.

Motorized measuring machines are advantageously used for the dimensional control of a plurality of similar or nominally identical parts. In this case, a measuring program is established beforehand and executed in a manner that is always identical on each part. Making such programs is relatively time-consuming and not really suited for small series.

Manual measuring machines, on the other hand, are preferably used for unique measurements or for measuring a small quantity of parts for which it would not be advantageous to create a specific measuring program.

BRIEF SUMMARY OF THE INVENTION

One aim of the present invention is to propose a measuring machine free from the limitations of the known devices.

Another aim of the invention is to propose a measuring machine with a simplified and intuitive programming interface combining the programming advantages on the manual machine with the control abilities of the motorized machine.

According to the invention, these aims are achieved notably by means of the object of the independent claims.

BRIEF DESCRIPTION OF THE FIGURES

Examples of embodiments of the invention are indicated in the description illustrated by the attached figures wherein.

EXAMPLE(S) OF EMBODIMENTS OF THE INVENTION

Figure 1:
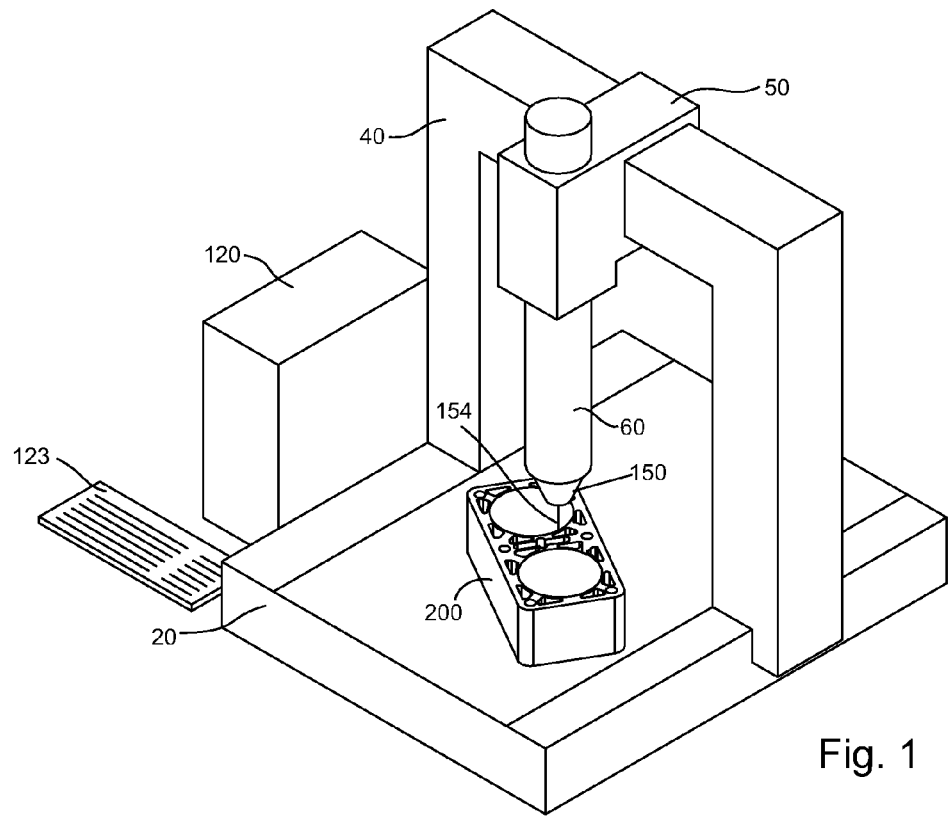
FIG. 1 illustrates diagrammatically a measuring machine with traveling bridge.

FIG. 1 represents a coordinate measuring machine of a conventional type, with a traveling bridge. A part to be measured is positioned on the table 20. The bridge 40 travels relative to the table 20 along a horizontal axis Y and the carriage 50 can slide on the cross slide of the bridge along a horizontal axis X, whilst the measuring head 60 can be moved along the vertical axis Z so as to be capable of positioning the measuring head in any position in the three-dimensional measuring space of the CMM. The measuring head makes it possible to orient the feeler in a predefined direction, thus enabling greater touch sensitivity relative to the surface that is to be measured. The movements of the bridge 40, of the carriage 50 and of the measuring head 60 along the axes XYZ are read thanks to position encoders (not visible in this figure) by the control unit 120 which can reconstruct the coordinates XYZ of the measuring head. The latter's orientation and direction of approach then enables the contact point with the part 200 measured by the tip 154 of the feeler 150 to be determined. The measuring head can be manually oriented respectively motorized, the control unit computes the position of the contact point from angular data either predetermined or supplied by the encoders of the multi-directional head.

In the case of a motorized machine, the displacements along the axes XYZ are performed by motors, for example electric motors, according to a program recorded in the control unit 120, or following displacement commands entered or real time control by an operator, for example by means of the keyboard 123 or another input device.

The CMM of FIG. 1 comprising three linear axes according to a bridge structure is used in the following description. It must however be emphasized that this structure is used only to provide a concrete basis to the embodiments presented but that it does not constitute a limiting or indispensable characteristic of the invention, which can also apply to machines with other axis configurations, in particular with a greater or lower number of linear axes, as well as to CMMs having one or several rotation axes. The invention can also apply to measuring machines provided with other types of probes, such as for example scanning, optical or laser probes, or probes with induction or capacitive sensors. This can also apply to machines combining displacements of the part to be measured and displacements of the measuring sensor, such as for example in CMMs with mobile or rotating table.

Figure 2:
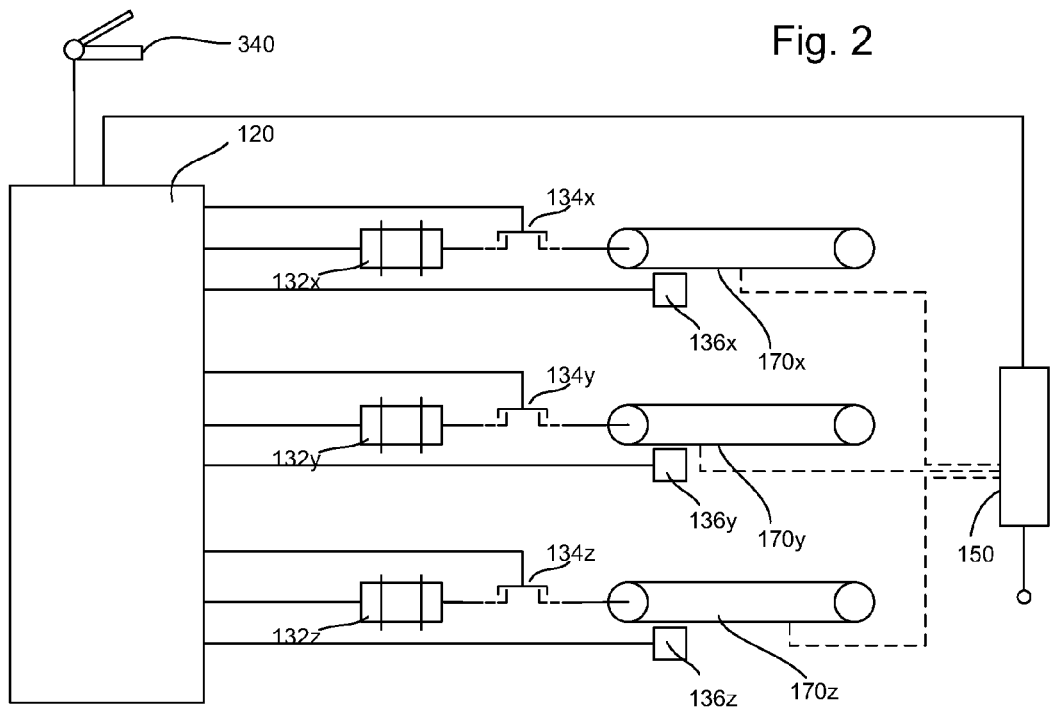
FIG. 2 illustrates diagrammatically the structure of a The coordinate measuring machine of one aspect of the invention.

FIG. 2 represents diagrammatically the driving and control systems of a The coordinate measuring machine of one aspect of the invention. The measuring probe 150 is displayed along the three axes X, Y, Z by the three driving elements 170$x$, 170$y$, 170$z$ driven by three motors, also called actuators, 132$x$, 132$y$, 132$z$ controlled by the control unit 120. The encoders 136$x$, 136$y$, 136$z$ read the positions of the elements 170$x$, 170$y$, 170$z$ and supply them to the control unit 120. Other elements can supply event information to the control unit, such as for example switches, push-buttons or analog or trigger sensors.

It is possible to adopt, within the frame of the invention, any appropriate system capable of ensuring that the motors' rotation movement is converted into a translation movement of the driving elements 170x, 170y, 170z. Flexible transmission elements, for example cables or belts, or even helical connections of the type screw-nut or ball-screws can for example be used. One can also use linear motors that directly generate a translation movement, for example linear electric motors or piezoelectric or ultrasound motors.

Generally, it is inadvisable and often impossible to displace manually the measuring head of a motorized CMM, because of the considerable strains that this would generate in the transmission system. The system of FIG. 2 includes clutches 134x, 134y, 134z enabling in active state the elements 170x, 170y, 170z to be decoupled from the actuators, thus allowing manual displacements of the measuring head and probe.

The clutches are controlled automatically by the control unit 120. One could also conceive systems with friction couplings, which disengage spontaneously the actuators 132x, 132y, 132z from the elements 136x, 136y, 136z when the transmitted torque and/or force exceed a predetermined threshold, or one-way mechanisms, allowing the measuring head 150 to move following eternal forces without driving the actuators 132x, 132y, 132z. The operator also has the possibility of actuating the clutches at will, leaving one or several axes free of movement. The clutches can be activated electrically, mechanically or pneumatically through the control unit. Clutches with low wear and tear and low heating in friction mode will also be preferred.

The inventive CMM has a programming mode in which the control unit actuates the clutches 134x, 134y, 134z to partly or totally decouple the actuators 132x, 132y and 132z, and allow the measuring head 150 to be manually displaced, the instantaneous position given by the encoders 136x, 136y, 136z to be recorded and, during contact of the tip 154 with a part to be measured, the information of the measurement point to be computed and stored in a program. The CMM of the present invention also include a measuring mode, in which the axes XYZ are driven by the motors 132x, 132y, 132z, controlled by the control unit 120 so as to reproduce the displacements and contacts recorded during the programming mode. The mechanical power necessary for the movements is supplied entirely by the motors 132x, 132y, 132z in the measuring mode, and entirely or partly by the operator in the programming mode.

In a variant embodiment of this invention, the actuators are partly coupled, i.e. they are coupled only during a short instant in order for the motors to act, so that the operator can displace the measuring system manually. The coupling is designed so that it exerts a torque to assist in braking or accelerating the measuring device and also serves to maintain the measuring device in position in the absence of continuous force exerted by the operator. This mode aids the operator to perform the displacements whilst leaving the operator the choice of applying accelerations to vary the speed to increase or decrease it, within fixed speed limits. This displacement mode is based on the acceleration and the speed achieved from the measurement of the position.

In another variant embodiment of the invention, the friction torque transmitted from the actuators in uncoupled mode is lower than the torque transmitted in coupled mode. This enables the coupling at the clutch to slide more easily when the measuring head is manipulated externally. The uncoupled mode is initiated by the operator either by exerting sufficient force on the measuring head or by acting on a trigger, of the switch type, which thanks to the control unit allows a switch from a coupled mode to an uncoupled mode to perform the programming and back again.

Figure 3:
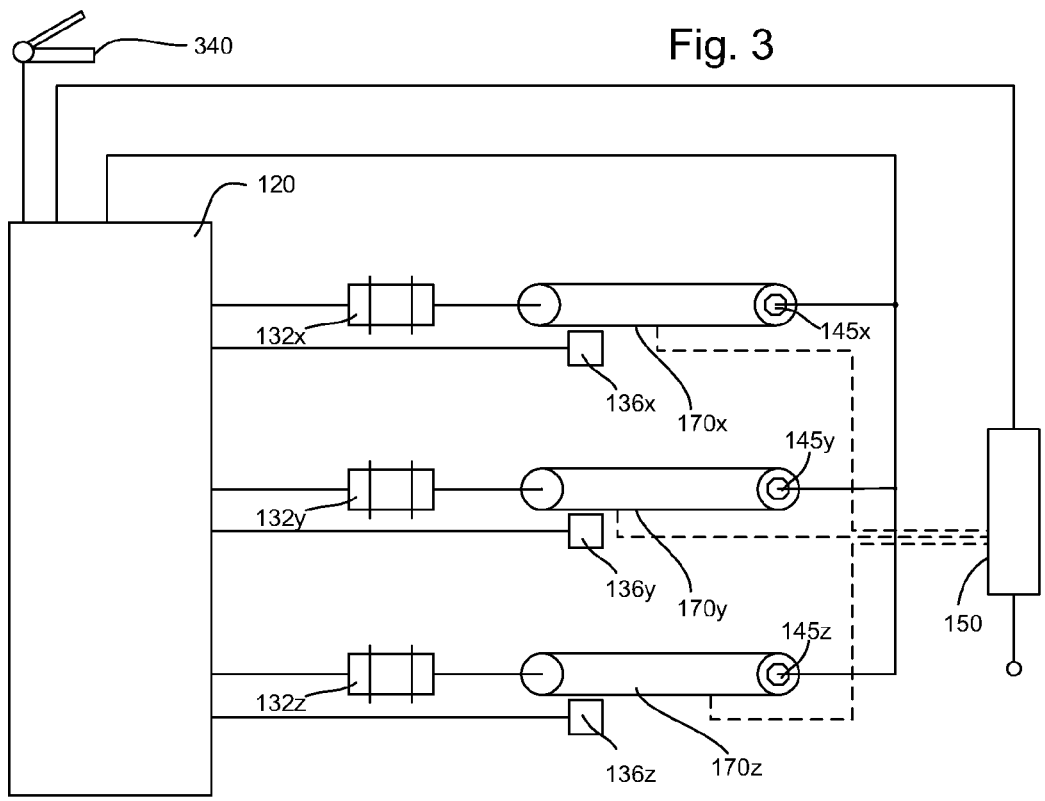
FIGS. 3, 4 and 5 illustrate diagrammatically the structure of a The coordinate measuring machine of variant embodiments of the invention.

FIG. 3 illustrates a variant embodiment of the invention wherein the actuators 132x, 132y, 132z of the CMM are always coupled with the axes XYZ and supply the mechanical power necessary for the measuring head 150 to move both in the measuring mode and in the programming mode. The CMM in this embodiment includes force (or torque) sensors 145x, 145y, 145z in the system for actuating the axes XYZ, sensitive to external forces acting on the measuring head 150, for example to the forces exerted manually by an operator on the measuring head 150. In the programming mode, the control unit receives force signals from the sensors 145x, 145y, 145z and controls the actuators 132x, 132y, 132z to displace the measuring head in the desire manner, for example proportionally and in the direction of the force applied manually on the measuring head 150, thus enabling the measuring head to be displaced in an entirely intuitive manner by exerting a low force manually to achieve a great motor force at the actuators. This mode can also be called force amplification mode, since the applied force is amplified by the motors.

The nature and location of the sensors 145x, 145y, 145z will preferably be selected according to the structure of the CMM's transmission and driving system. It is conceivable, for example, to use constraint gauges or piezoelectric force sensors or elastic systems or even sensors integrated with the position sensors 136x, 136y, 136z. The force sensors 145x, 145y, 145z will preferably be placed so that their use will not affect the accuracy between the coordinate measuring sensors and the probe's contact point.

One will preferably avoid the application of very weak external forces, as they would easily be confused with interferences, or of excessively intense external forces, as they would alter the machine's precision. Optimally, the machine will be designed to react to forces exerted by the operator comparable to those encountered during measuring impacts and sufficient to get the machine's movement to stop. The speed at which the inventive measuring machine moves will preferably be limited below an upper threshold allowing the CMM to be immobilized quickly at the moment of measuring impact. In a variant, the control unit is arranged to adjust and reduce automatically the speed when the value set by the user is too high or in case an impact occurs.

Figure 4:
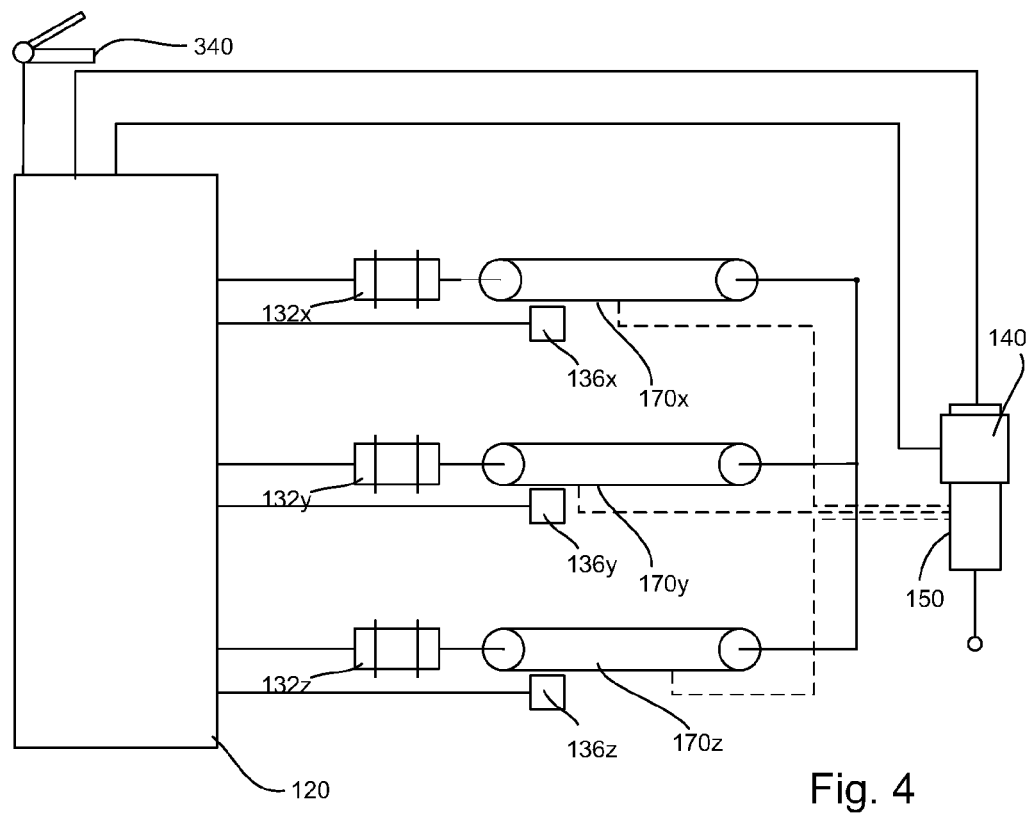
Figure 5:
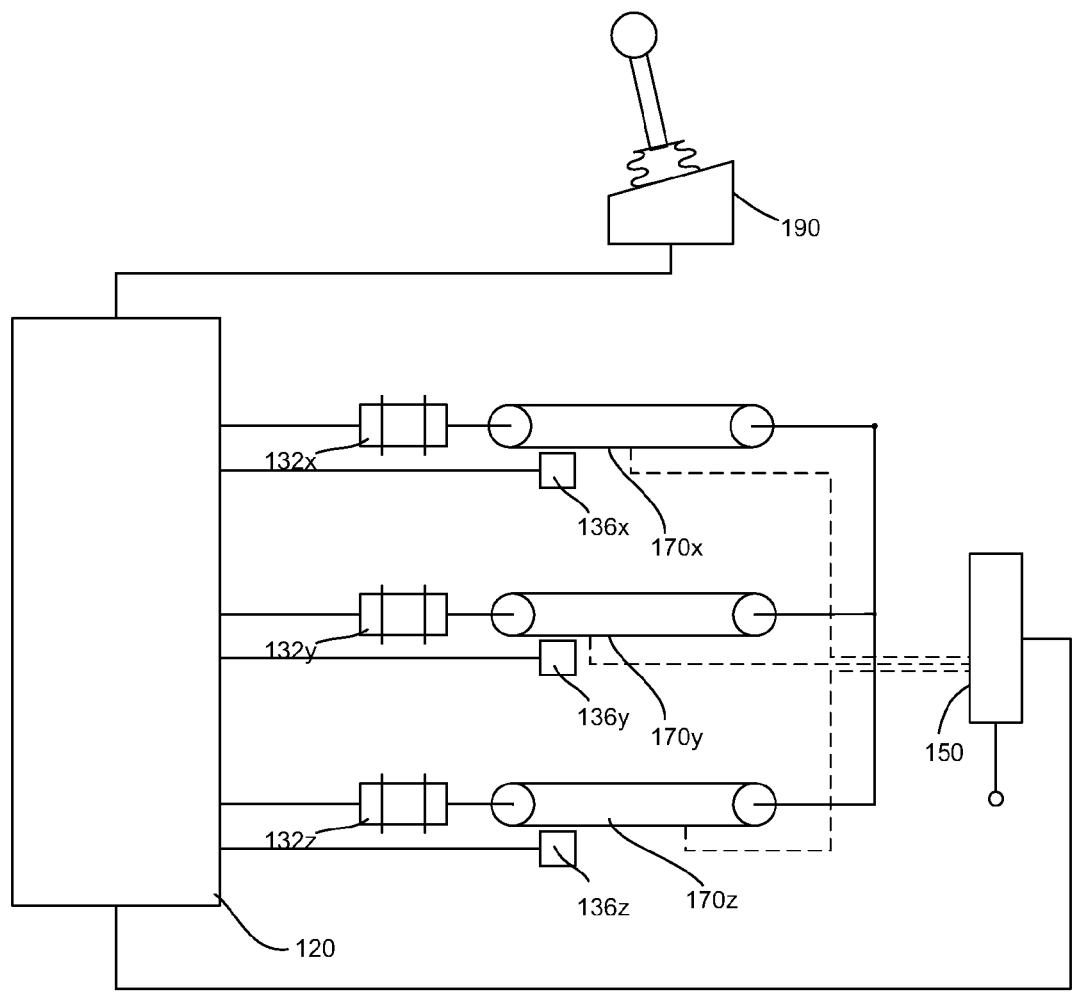

According to another embodiment of the invention illustrated in FIG. 4, the measuring head 150 is provided with a user interface element 140 sensitive to manual actions of the operator, for example an interface element sensitive to forces exerted manually by the operator. In the programming mode, the control unit 120 receives the operator's manual actions through the interface element 140 and controls the actuators 132x, 132y, 132z to displace the measuring head in the desired manner, for example in the direction of the force applied manually on the interface element 140. Preferably, the user interface element 140 is integrally united with the measuring head 150 and moves with the latter. In the simplified variant embodiment illustrated in FIG. 5, it is replaced by a stationary device 190.

According to a variant embodiment presented in FIG. 4, the probe is replaced by an operating element for directing the measuring system towards the different measuring positions in an approximate manner without effecting a measuring impact. The measurement points are then memorized manually through the intervention of the operator on a trigger. The positioning accuracy of each measurement point will then be refined in the validation mode with a real feeler and a final approach until impact. This mode has the advantage of enabling large-size machines to be controlled by sight and touch with far fewer risks of collisions than by remote controlling.

In these different embodiments, the programming mode can also be initiated by a specific action from the operator on the control unit. In most modes, such as for example the force amplification mode, this prevents the amplification of interferences and uncontrolled displacements of the machine in reaction to shocks or undesirable external vibrations. The machine is preferably programmed to accept as displacement command only manual forces applied for a duration greater than a determined time threshold in order to filter vibrations as well as forces deriving from involuntary contacts or dynamic forces. When faced with abnormal or non-interpretable commands, the inventive measuring machine is preferably programmed to revert to the stationary state for safety reasons.

According to one aspect of the invention, the system is capable of generating and memorizing points of transition, of by-passing, of measurement and of special operations such as tool switching. The measurement points are differentiated by the detection of the part to be measured at the level of the probe. It is often advantageous to memorize additional points that do not correspond to impacts with the part to be measured. Memorizing the points can thus be achieved by information from the probe at the moment of impact or by the operator's intervention on at least one independent trigger 340 (FIG. 2), such as a switch or push-button, or pedal, or any other appropriate instruction input means, in order to define a measurement point for a touchless probe, or for adding additional points. The memorized points can be differentiated according to type either directly during the programming mode or subsequently in the editing mode.

Among the additional points that can be found, there are by-passing points that allow collisions with the part to be measured to be avoided so that the measuring head moves away from the part while moving. There are operation points that serve to perform special operations such as for example changing the head or feeler, calibrations to ensure the correlation of the points before and after the change to the head or feeler, reorientations of the head. There are also transition points for defining particular conditions, such as for example positioning the head before going in one direction and at a specific approach speed to perform an accurate measurement, knowing that the direction of approach during the measurement must be close to the perpendicular angle at the surface. The system will also seek to optimize the displacements to fulfill these criteria in optimum fashion and guarantee the reproducibility of the measurement in the finalized measuring program.

In order to deduce the direction of approach, the measuring system is based on several points defining an elementary shape, this information is then used to correct the direction of approach and to determine the necessary transition points so that the measurements of each point involved in this shape are approached in optimum fashion. This information about direction then allows the position of the impact on the sphere of the feeler that is at the end of the probe to be determined precisely, and furthermore the quality of this information enables the measurement error and the dispersion of the measured values to be reduced, thus decreasing the number of measurements necessary.

For operation points such as tool switches, a change of the measuring head or of the feeler could be performed with the aid of a tool rack or the orientation of the measuring head could be changed with a motorized head. The programming of these operations will be made easier for the operator who will be able, for example, to effect manual interventions and simply report them into the programming in editing mode. This will thus make it possible to program points either in programming mode or in editing mode.

The inventive CMM preferably includes a validation mode to obtain a measuring program with the same quality as that which would have been achieved without manual action nor influence from the operator. This mode includes for example steps of correcting the measurement points, comprising the subtraction of the deflection arising from the external force from the operator, and/or steps of correcting the approach vectors to ensure that the directions and speeds for approaching the surfaces to be measured lie between determined limits taking into account the latter's orientations, and/or steps of validating the additional points added in editing mode. Optimally, the validation mode includes the execution, at low speed and/or step-by-step of the recorded sequence of displacements, during which the operator can intervene, for example by stopping the sequence and reverting to editing mode or programming mode to perform corrections. Once the validation completed, the measuring program is finished and optimized for the measuring mode. This validation is not indispensible but preferable.

According to an optional aspect of the invention, the measuring machine is programmed to determine, once the program is replayed, the orientation of the part to be measured from the elementary shape resulting from a plurality of measurement points and thus to adapt the frame of references of the measuring program to the actual orientation of the part.

The invention claimed is:

1. A coordinate measuring machine (CMM) having: a measuring head provided with a measuring probe; one or several measurement axes; one or several actuators designed to displace said measuring head along said measuring axes; one or several encoders designed for supplying one or several measurement coordinates of the part to be measured; a control unit for controlling said actuator or actuators, wherein the measuring machine includes a programming mode in which said control unit controls said actuator or actuators to uncouple said actuator or actuators from said measuring head when in said programming mode such that said measuring head can be displaced by an operator through manual actions on said measuring head and said control unit is designed to record the displacements of said measuring head and memorize the measurement points during contact between said measuring probe and said part to be measured;

wherein the measuring machine includes a measuring mode in which said control unit is designed to control said actuators and reproduce the displacements of said measuring head recorded during said programming mode.

2. The coordinate measuring machine of claim 1, wherein said actuators are provided with clutches controlled by said control unit and designed to uncouple said actuators from said measuring head during said programming mode.

3. The coordinate measuring machine of claim 1, wherein said measuring head is multi-directional, the machine having angular actuators designed for modifying the orientations of said measuring head and controlled by said control unit, and angular encoders, connected to said control unit and supplying information on the orientation of said measuring head.

4. The coordinate measuring machine of claim 1, wherein the mechanical power necessary to the movement of the CMM in the programming mode is manually applied by the operator.

5. The coordinate measuring machine of claim 1, having at least one means for entering instructions, designed for programming transition points or points of specific operations.

6. The coordinate measuring machine of claim 1, wherein the orientation of said probe can be modified and memorized in said programming mode.

7. The coordinate measuring machine of claim 1, wherein said control unit is programmed for subtracting from the memorized measurement points the deflection caused by the external force from the operator.

8. The coordinate measuring machine of claim 1, having at least one programming mode and one measuring mode, the mode switch being initiated by an action of the operator on an instruction input means or on said measuring head.

9. The coordinate measuring machine of claim 1, wherein said control unit is programmed so as to adapt the frame of references of said measuring program according to the orientation of each part to be measured.

10. The coordinate measuring machine of claim 1, wherein said control unit is programmed to correct the displacements of said measuring head in order to correct the approach vectors to the surfaces to be measured.

11. The coordinate measuring machine of claim 1, wherein said control unit is programmed to determine the orientation of the surfaces measured from the elementary shape resulting from a plurality of measurement points.

12. The coordinate measuring machine of claim 1, having an editing mode that allows additional points to be added and points already memorized in the program for displacing said measuring head to be modified.

13. The coordinate measuring machine of claim 1, having a validation mode that allows the quality of the points necessary for the displacements of said measuring head to be checked.

14. A method for controlling a coordinate measuring machine (CMM), with the machine having: a measuring head provided with a measuring probe; one or several measurement axes; one or several actuators designed to displace said measuring head along said measuring axes; one or several encoders designed for supplying one or several measurement coordinates of the part to be measured; a control unit for controlling said actuator or actuators, said method including:
a programming step in which:
said measuring head is placed in a free mode by said control unit such that it is displaceable by external forces, said head actuators being at least partially uncoupled from said measuring head; -said control unit is activated to record control data received by said measuring head while at measurement points;
control data are recorded by said control unit;
a control program for automatic displacement of the measuring head is derived from the recorded control data, said control program including actuator commands to command measuring head positions at multiple control points;

and a measuring step in which:
said measuring head is placed in actuated mode by said control unit for automatic displacement of the measuring head commanded by the control program;
the measuring head is displaced sequentially to control points, as commanded in said control program;
at each control point, control measures are made and recorded.

15. The method of claim 14, further having an editing step in which said operator can add additional points and/or modify the recorded measurement points.

16. The method of claim 15, further having a validation step in which the deflection caused by the external force from the operator is subtracted from said measurement points and/or the approach vector(s) to the surface to be measured are corrected.

17. The method of claim 14, wherein in said free mode, said actuators are uncoupled from said measuring head.

18. A method for controlling a coordinate measuring machine (CMM), with the machine having: a measuring head provided with a measuring probe; one or several measurement axes; one or several actuators designed to displace said measuring head along said measuring axes; one or several encoders designed for supplying one or several measurement coordinates of the part to be measured; a control unit for controlling said actuator or actuators, said method including:
a programming stem in which:
said measuring head is placed in a force amplification mode such that it is displaceable by said actuators commanded by at least one force sensitive interface element;
said control unit is activated to record control data received by the measuring head while at measuring points;
control data are recorded by the control unit;
a control program for automatic displacement of the measuring head is derived from the recorded control data, said control program including actuator commands to command measuring head positions at multiple control points;
and a measuring step in which:
the measuring head is placed in actuated mode by the control unit for automatic displacement of the measuring head commanded by the control program;
the measuring head is displaced sequentially to control points, as commanded in the control program;
at each control point, control measures are made and recorded.

19. The method of claim 18, wherein in said force amplification mode, at least one force sensitive interface element is adapted to receive input commands and transmit these input commands to the control unit, allowing the control unit to command corresponding displacement forces to the actuators to provide the corresponding measuring head displacements.

* * * * *